July 15, 1969     F. F. SHAMP     3,455,143

CALIBRATION AND PROVING OF METERS

Filed Oct. 31, 1966     2 Sheets-Sheet 2

INVENTOR.
Francis F. Shamp,
BY
ATTORNEY.

United States Patent Office 3,455,143
Patented July 15, 1969

3,455,143
CALIBRATION AND PROVING OF METERS
Francis Furman Shamp, Houston, Tex., assignor to Esso Research and Engineering Company
Filed Oct. 31, 1966, Ser. No. 590,839
Int. Cl. G01f 25/00
U.S. Cl. 73—3                                      9 Claims

ABSTRACT OF THE DISCLOSURE

Method and apparatus are provided for calibrating and proving meters measuring fluid volume in a pipeline which involves incrementally injecting into said pipeline at least first and second detectable amounts of a fluorescent material which are detected at a spaced apart point from the injection point in the pipeline, the second detectable amount being injected by arrival and detection of the first amount at the second selected point, the volume of fluid flowed through the meter during a selected period of time being compared with the volume of fluid flowed through the pipeline between the first and second points during the selected period of time.

---

Figure 1:
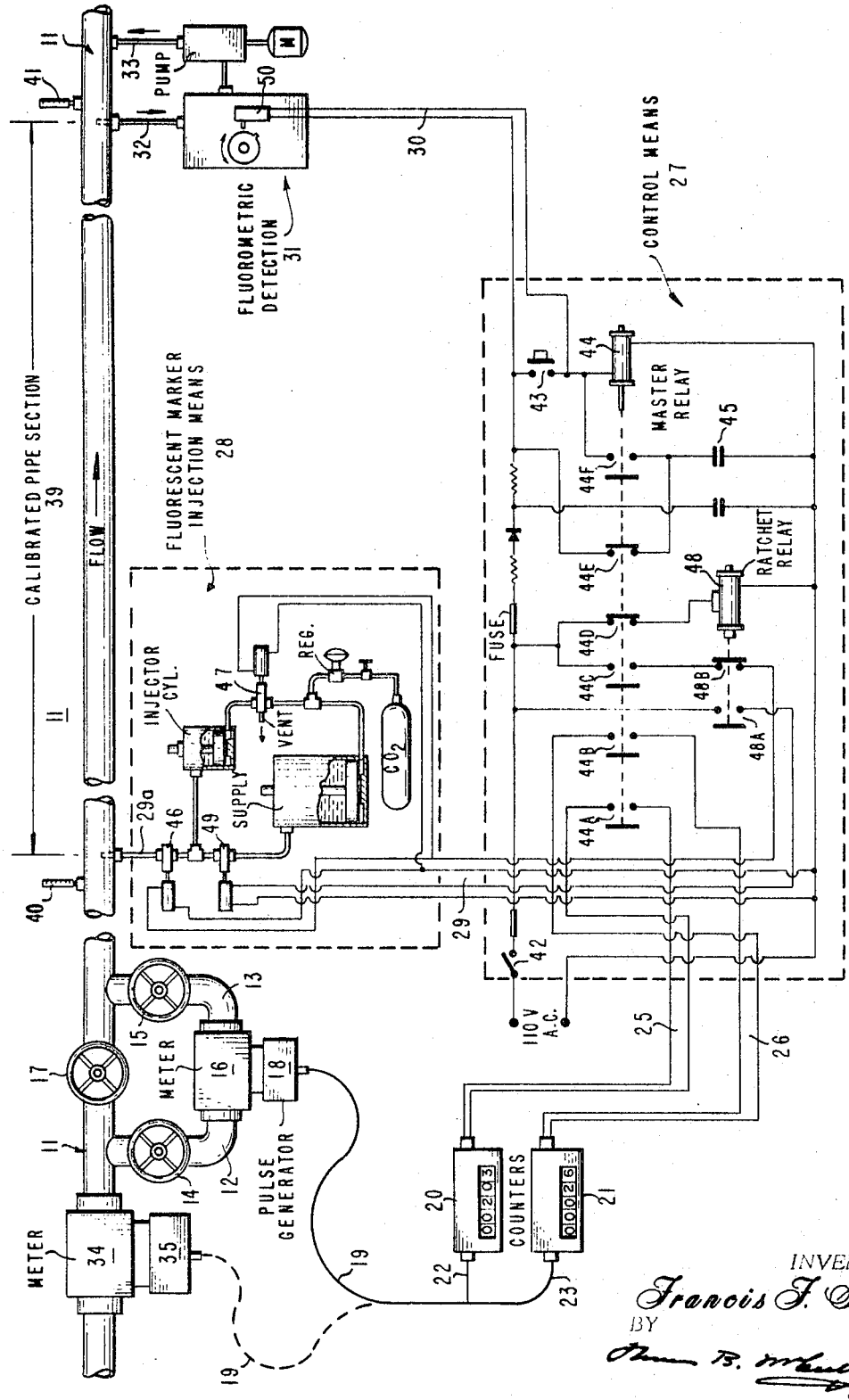

The present invention is directed to a method and apparatus for calibrating and proving meters. More particularly, the invention is concerned with the calibration and proving of fluid meters employed in fluid pipelines. In its more specific aspects, the invention is concerned with the calibration and proving of fluid measurement devices in a pipeline.

The present invention may be briefly described as a method for calibrating and proving a meter measuring the volume of fluid in a pipeline through which the fluid is flowing. In the practice of the present invention, at least first and second detectable amounts of a fluorescent material are incrementally injected into the fluid flowing in the pipeline at a first selected point. The fluid containing the detectable amounts of the fluorescent material is flowed through the pipeline to a second selected point and on arrival of the fluid containing the fluorescent material at the second selected point, the fluorescent material is detected at a selected level of fluorescence. The second amount of the fluorescent material is injected into the pipeline when the first amount of the fluorescent material arrives at the second selected point. The volume of the fluid flowed through the meter during a selected period of time is compared with the volume of fluid flowed through the pipeline between the first and second points during a selected period of time.

The present invention may be practiced with apparatus including means for incrementally injecting detectable amounts of fluorescent material into the pipeline at a first selected point in the pipeline. Detecting means located downstream from the injecting means is provided for detecting the arrival of the fluorescent material at the second selected point in the pipeline. First and second counting means are operatively connected to the injecting means and the injecting means and the detecting means are operatively connected by means for operating the injecting means. The detecting means comprises means for alternately starting and stopping the first and second counting means and the meter located in the pipeline into which fluid is flowing is operatively connected to the counting means.

The meter may be any type of meter such as a displacement meter, turbine meter, velocity meter, differential type meter, and meters of all types that register accumulated measured volumes on a suitable electronic or mechanical register, such as electronic digital counters. The fluorescent material is suitably an oil soluble fluorescent material such as but not limited to Patent Chemical Corporation's (Paterson, N.J.) Oil Color No. 131 Super Concentrate.

The oil soluble fluorescent material is suitably injected into the pipeline as a solution in a suitable solvent which may be a hydrocarbon or an oxygenated solvent such as an aliphatic alcohol, a ketone, an aldehyde, and other organic materials in which the fluorescent material is soluble and which is compatible with the fluid flowing through the pipeline. The fluid flowing through the pipeline is suitably a gaseous or a liquid material. For example, the fluid may be hydrocarbon liquids, gases or mixtures of hydrocarbon gases and liquids. For example, the fluid may be natural gas made up of normally gaseous hydrocarbons or it may be a hydrocarbon liquid such as crude petroleum or fractions thereof such as liquefied natural gas, gasoline, kerosene, gas-oil, diesel oil, lubricating oil or the hydrocarbon components of the several fractions.

In the practice of the present invention, a selected portion of the pipeline between the first and second selected points is employed as a proving section for the meter. This proving section of the pipeline may be either upstream or downstream of the meter. However, for the purposes of description in accordance with the present invention, it will be described with the calibrated section of the pipeline located downstream from the meter.

Figure 2:
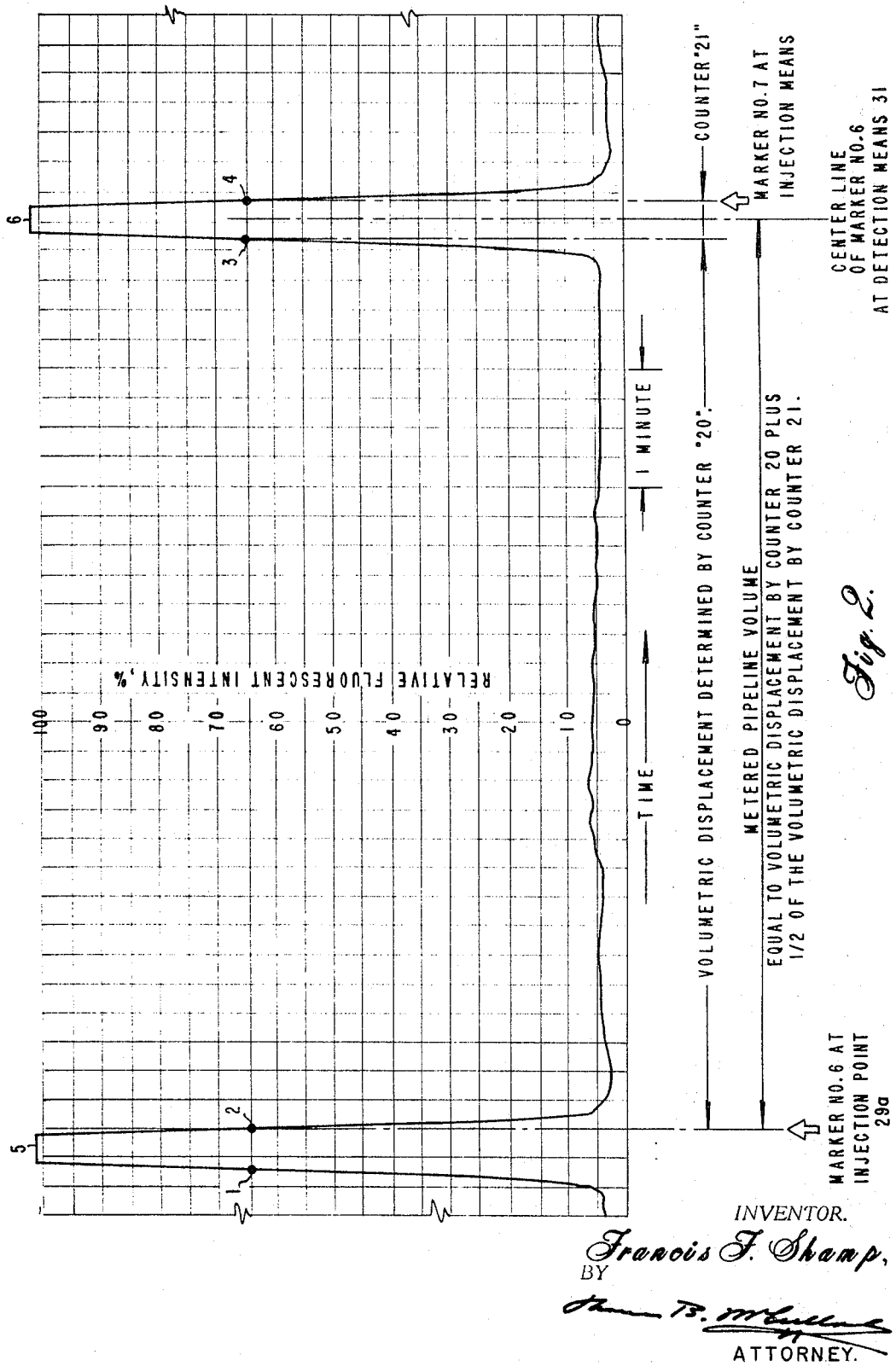

The present invention will be further illustrated by reference to the drawing in which a best mode and embodiment are described and in which FIGURE 1 is a flow diagram of the practice of the present invention;

FIGURE 2 is a plot or chart showing the injection of a fluid marker at one station and the arrival of that fluid marker at a second station.

Referring now to the drawing in which identical numerals will be employed to designate identical parts, numeral 11 designates a pipeline through which a fluid such as a liquid hydrocarbon mixture is flowing. Connected into the pipeline by branch lines 12 and 13 controlled respectively by valves 14 and 15 is a master meter 16. A bypass valve 17 allows the fluid to be by-passed from pipeline 11 through meter 16. Meter 16 is provided with an incremental volumetric pulse generator 18 operatively connected thereto which is connected through an electrical conduit means 19 to electric counters 20 and 21 through parallel electric connecting means 22 and 23.

The counters 20 and 21 are also electrically connected by electric connecting means 25 and 26 to the electrical control means 27. The injection facility 28 containing a supply of a solution of a fluorescent marking material is also electrically connected to electrical control means 27 by electric connecting means 29. Injection means 28 is connected by a line 29a to pipeline 11. This connection to pipeline 11 is at a first selected point. The electrical control means 27 is connected by electric connection means 30 to a fluid detection facility or means 31 which in turn is connected to pipeline 11 at a second selected point by line 32 which feeds a portion of the pipeline flow into the detection means 31 for detection of the fluorescent material which portion is re-injected into the pipeline 11 by line 33.

The master meter 16 may be a permanent part of the facilities or a temporary part of the facilities and may be disconnected and removed as may be desired.

A line meter 34 is arranged in the pipeline 11 upstream from the meter 16 and like the meter 16 is provided with a pulse generator 35 to generate pulses per incremental measure of volume flowing through the meter 34. The pulse generator 35 may also be connected by electric connection means 19 to electric counters 20 and 21. When the meter 16 is not being employed, electrical conduit 19 is disconnected from pulse generator 18 and may be connected to pulse generator 35.

In the practice of the present invention, to calibrate a pipeline 11 such as shown in FIGURE 1 between the injection point 29a and the detection point 32, the pipeline section 39 would be a selected calibrated pipe segment. In accordance with the present invention with stable flow conditions established through the pipeline 11 and the pipe section 39 to be calibrated, the electric counter 21 is counting and the injection means 28 is loaded with fluorescent material; the detection means 31 is monitoring the fluorescent intensity of a sample of the passing fluid stream. The sequence of calibration runs is then initiated with a fixed quantity of fluorescent dye being injected into the steam flowing through pipeline 11, the counter 20 is started and the counter 21 is stopped. When the initial increment of fluorescent material arrives at the detection means 31, the measured fluorescent intensity of the fluid marker increases to a selected level tripping a counter circuit which through the electric connection means 30 and electrical control means 27 causes simultaneous switching of counting means 20 and 21, i.e. counter 20 stops and counter 21 starts accumulating the pulses generated by generator 18. When the measured fluorescent intensity of the first increment of fluorescent material decreases to a value below the selected level, the counter circuitry again causes simultaneous switching of counting means 20 and 21 and injection of a second increment of fluorescent material from the injection means 28. Means 40 and 41 are provided for determining the temperature at each end of the pipe section 39. These means 40 and 41 are shown as thermometers in thermometer wells but it will be understood that any temperature means may be used. A number of repeat runs are then made in the manner described.

The additional meter displacements as determined by the electric counters 20 and 21 are computed from the following equation. The volume of pipeline section 39 equals the accumulated count of counter 20 plus ½ accumulated count of counter 21. By repeated calibration runs, the average volume of the pipeline 39 is determined and the percent variation between the runs is checked.

After the average volume has been determined, another series of calibration runs is made and compared to the average volume. When two succeeding series of runs check within ±0.01%, the pipeline is calibrated to the required accuracy of a primary prover device. The line meter 34 which may be a plurality of meters may then be proved against the calibrated pipe section 39.

The procedure of proving the meter 34 employs the same method and apparatus employed for calibrating the pipe section 39. In this practice, the injection and detection of fluid calibration markers and simultaneous starting and stopping of electronic counters totalizing the output from an incremental volumetric pulse generator is the same as the pipe segment calibration technique.

In order to illustrate the present invention further, reference is now had to FIGURE 2. FIGURE 2 is a chart illustrating recording of marker signals detected by the detection means 31 of FIGURE 1. The horizontal scale is "time" and the vertical scale is "relative fluorescent intensity" of the fluid sample stream passing through the detection means 31. Referring now both to FIGURES 1 and 2, the detection means 31 continuously measures the fluorescent intensity of the fluid sample stream and is equipped with means to initiate an electrical detection signal at a set point. As illustrated in FIGURE 2, the set point is at 65% relative fluorescent intensity, but is not limited to this setting. It could be set at any point between say 20% and 90% of the intensity. Each marker injected at injection point 29, FIGURE 1, produces a resultant marker dispersion at detection means 31 as illustrated by FIGURE 2. It is to be noted the detection point of FIGURE 2 is a point halfway between set points 3 and 4 on the symmetrical fluorescent signal of marker No. 6 while the initial point is at set point 2 on the symmetrical fluorescent signal of marker No. 5, which indicated arrival of the end of fluid marker No. 5 at the detection means.

Referring back to FIGURE 1, a more detailed explanation of electrical circuitry will further explain the technique employed. The central control of the system is through electrical control means 27. Its operation, but not necessarily limited to the method described, is illustrated as follows:

Initial injection of a marker at injection point 29 may be accomplished by closing switch 42 and pushing "push button" 43. By this operation, master relay 44 is energized and held energized for about 5 seconds by the slow discharge of capacitor 45. Simultaneously, upon energization of master relay 44, contacts 44A close, gating idle counter 20 to commence counting, contacts 44B close, gating counter 21 to stop counting, contacts 44C close to energize solenoids 46 and 47 thus initiating the injection of fluorescent marker, contacts 44D then open to de-energize and ratchet direct operating ratchet relay 48 (no change of contacts 48A and 48B), contacts 44E then open while contacts 44F close allowing charged capacitor 45 to discharge slowly through the holding coil of master relay 44. Ratchet relay 48 operates to change switching positions only upon being energized. In one position contacts 48A are open and 48B are closed. This position of contacts is maintained until the relay 48 is again energized, at which time 48A is closed and 48B is opened. De-energizing does not change contact position. After about 5 seconds capacitor 45 becomes discharged, master relay 44 drops out completing the 5-second impulse through contacts 44A and 44B to counters 20 and 21, respectively. The count mode of these counters is not affected by drop out of master relay 44. The only significant operations that occur on drop out of master relay 44 are: contacts 44F open and contacts 44E close allowing capacitor 45 to recharge, contacts 44C open and 44D close energizing ratchet relay 48 which in turn initiates another operation. Simultaneously, open contacts 48A close to energize solenoid valve 49 and closed contacts 48B open, de-energizing solenoids 46 and 47. By this operation the injector is shut off and refilled for the next injection.

Upon arrival of an injected marker at the detection facility 31, the intensity of fluorescence increases, as illustrated in FIGURE 2, until point 1, the set point is reached. Fluorescent intensity detected in unit 31 causes a dial in the unit to rotate counterclockwise and at a selected point 1, momentarily close microswitch 50. When point 1 is reached, microswitch 50 of FIGURE 1 closes momentarily, completing an electrical circuit through electrical conduit 30, energizing master relay 44. Master relay 44 is held energized by capacitor 45, as described previously, for about 5 seconds. When master relay 44 is energized it simultaneously:

(1) Gates idle counter 21 to commence counting the dispersion of the fluorescent material in the fluid stream commencing from time of arrival (point 1 of FIGURE 2) and continuing until its passage (point 2 of FIGURE 2) at the detection point.

(2) Gates counter 20 to stop counting the volumetric displacement from the injection point 29.

(3) Contacts 44E open and contacts 44F close allowing charged capacitor 45 to discharge slowly through the holding coil of master relay 44.

(4) Contacts 44C close but with contacts 48B now open, the operation of solenoids 46 and 47 is inhibited.

(5) Contacts 44D open to de-energize and ratchet direct operating ratchet relay 48.

After about 5 seconds capacitor 45 becomes discharged and master relay 44 drops out at which time these significant operations occur again and simultaneously:

(1) Contacts 44F open and contacts 4E close allowing capacitor 45 to recharge.

(2) Contacts 44C open and 44D close, energizing ratchet relay 48, which in turn initiates another simultaneous operation: closed contacts 48A open to de-energize and shut off solenoid valve 49 completing the recharge (refill) operation of the injector preparatory for the next injection.

After the marker's fluorescent intensity decreases to point 2 of FIGURE 2, microswitch 50 (operated by the dial, rotating in a clockwise direction) of FIGURE 1 closes momentarily, completing an electrical circuit through electrical conduit 30, energizing master relay 44 and thus completing the first cycle of the operation and simultaneously starting the second cycle of injecting a second marker at the injection point 29.

It is to be noted in FIGURE 2 that the interval of 1 minute reflects about 7½ minutes for the displacement of one batch of fluorescent material between the two points.

The distance between the two selected points was 1500 feet in an 8″ pipeline.

The date presented in Tables 1 and 2 below illustrate several runs made in the practice of the present invention on two different days in which a pipeline was calibrated to a percent variation within the accuracy required.

TABLE I.—METER A

Run No. 1.—Factor, 0.99873; Gasoline, 69.2° API; 710 BPH

| Marker No. | Metered Displacement, Bbls. at— | | Percent Variation |
|---|---|---|---|
| | Line Temp. | 60° F. | |
| 1 | | ¹ 92.708 | |
| 2 | 92.464 | 92.834 | −.059 |
| 3 | 92.590 | 92.758 | +.077 |
| 4 | 92.514 | 92.767 | −.005 |
| 5 | 92.523 | 92.734 | +.005 |
| 6 | 92.490 | 92.766 | −.031 |
| 7 | 92.522 | 92.773 | +.004 |
| 8 | 92.529 | 92.755 | +.011 |
| 9 | 92.511 | 92.766 | −.008 |
| | 92.522 | | +.004 |
| Total | 832.665 | | |
| Average | ² 92.5183/Marker | | |

$$\text{Pipe volume} = \frac{92.5183 \times .99873}{0.9961} = 92.7625 \text{ bbls.}$$

Run No. 2.—699 BPH, Temp. (Avg.) =65.7° F., Vol. Corr. Factor=0.9962

| 1 | 92.586 | 92.821 | +.076 |
|---|---|---|---|
| 2 | 92.502 | 92.737 | −.016 |
| 3 | 92.495 | 92.730 | −.022 |
| 4 | 92.514 | 92.754 | +.004 |
| 5 | 92.515 | 92.750 | +.000 |
| 6 | 92.470 | 92.705 | −.049 |
| 7 | 92.509 | 92.744 | −.008 |
| 8 | 92.503 | 92.738 | −.013 |
| 9 | 92.523 | 92.758 | +.008 |
| 10 | 92.530 | 92.765 | +.016 |
| | 925.152/10 runs | | |

$$\text{Pipe volume} = \frac{92.5152 \times 0.99873}{.9962} = 92.7502 \text{ bbls. or } -0.013\%$$

¹ Marker No. 1 = $\frac{92.464 \times .99873}{.9961}$ = 92.708.

² Line temp. (avg.) =65.8° F., vol. corr. factor=0.9961.

TABLE II.—METER A

Run No. 1.—Factor, 0.99795; Gasoline, 65.1° API; 725 BPH

[Avg. pipe volume from Runs 1 and 2 of Table I=92.7564 bbls.]

| Marker No. | Metered Displacement, Bbls. at— | | Percent Variation from 92.7564 Bbl. Vol. |
|---|---|---|---|
| | Line Temp. | 60° F. | |
| 1 | 92.602 | 92.681 | −.082 |
| 2 | 92.629 | 92.708 | −.062 |
| 3 | 92.617 | 92.696 | −.065 |
| 4 | 92.692 | 92.771 | +.016 |
| 5 | 92.673 | 92.752 | −.005 |
| 6 | 92.645 | 92.724 | −.035 |
| 7 | 92.662 | 92.741 | −.018 |
| 8 | 92.704 | 92.783 | +.029 |
| 9 | 92.681 | 92.760 | +.004 |
| 10 | 92.682 | 92.761 | +.005 |
| 11 | 92.661 | 92.740 | −.019 |
| Average | ¹ 92.6589 | | |

$$\text{Run No. 1 pipe volume} = \frac{92.6589 \times .99795}{0.9971} = 92.7332 \text{ bbls.}$$

or −0.025% less than vol. from Table I

Run No. 2.—724 BPH, Line Temp. (Avg.) =64.5° F., Vol. Corr. Factor=0.9971

| 1 | 92.658 | 92.737 | −.021 |
|---|---|---|---|
| 2 | 92.664 | 92.743 | −.015 |
| 3 | 92.679 | 92.758 | +.002 |
| 4 | 92.713 | 92.792 | +.038 |
| 5 | 92.767 | 92.846 | +.097 |
| 6 | 92.678 | 92.757 | +.001 |
| 7 | 92.606 | 92.685 | −.077 |
| 8 | 92.632 | 92.711 | −.049 |
| 9 | 92.648 | 92.727 | −.032 |
| Average | 92.6717 | | |

$$\text{Run No. 2 pipe volume} = \frac{92.6717 \times .99795}{0.9971} = 92.7414 \text{ bbls.}$$

or =0.016% below 92.7564 bbl. vol.

¹ Line temp. (avg.) =64.55° F., vol. corr. factor=0.9971.

The present invention is quite advantageous and useful in that accuracy of measurement is very close and repeatability is obtainable with little expenditure of time and money. The proving facilities including the pipe section, the master meter connections, the line meter, and a communication link between and an AC power supply at the injecting and detecting facilities, and a physical connection for the injection and detection means may be installed permanently. The other associated facilities may be portable for manual proving at other locations or permanently installed.

The present invention by virtue of its electronic operations is readily adaptable to automation. The pipeline which may be employed as part of the metering and proving system is not limited by size. The pipeline may be 6, 8, 10, 12 and up to 30 and 36″ in diameter without any great increase in cost. This is advantageous over other meter proving devices which use a calibration barrel. In the practice of the present invention, the amount of fluorescent material employed is quite small and does not impair the quality of the fluid being pumped since only 4 or 5 p.p.m. of the fluorescent dye appears in 4–5 barrels of the product. About 26 ml. of the fluorescent material comprised of about 50 ml. of dye per liter of kerosene and other petroleum products are employed. Thus, it will be seen that in pumping clean products such as gasoline, the material has no significant effect on quality but yet allows accurate volumetric measurement of the fluid to be made.

The invention is therefore quite important and useful.

The nature and objects of the present invention having been completely described and illustrated and the best mode and embodiment contemplated set forth, what I wish to claim as new and useful and secure by Letters Patent is:

1. A method for calibrating and proving a meter measuring the volume of hydrocarbon fluid in a pipeline through which said fluid is flowing which comprises:

flowing fluid through a meter in a pipeline during a selected period of time;

incrementally injecting into said fluid at a first selected point in said pipeline removed from said meter at least first and second detectable amounts of an oil soluble fluorescent material;

flowing said fluid containing said fluorescent material through said pipeline to a second selected point; and detecting the arrival of said fluid containing said first and second amounts of said fluorescent material at said second selected point at a selected level of fluorescence;

the second amount of said fluorescent material being injected by arrival and detection of said first amount at said second selected point; and the selected period of time beginning with the injection of one of said amounts of fluorescent material and ending with the arrival and detection of the same or a later one of said amounts at said selected point; and comparing the volume of fluid flowed through said meter during said selected period of time with the volume of fluid flowed through said pipeline between said first and second points during said selected period of time;

said meter being arranged in said pipeline in spaced relationship to said first and second selected points with respect to direction of fluid flow.

2. A method in accordance with claim 1 in which the fluorescent material is injected as a solution in a hydrocarbon solvent.

3. A method in accordance with claim 1 in which the fluid is a hydrocarbon liquid.

4. A method in accordance with claim 1 in which the fluid is a hydrocarbon gas.

5. A method in accordance with claim 1 in which the meter is upstream from said first and second selected points.

6. A method in accordance with claim 1 in which the meter is downstream from said first and second selected points.

7. A method in accordance with claim 1 in which the meter is arranged in said pipeline in spaced relationship to said first and second selected points with respect to the same direction of fluid flow.

8. Apparatus for calibrating and proving a meter measuring the volume of fluid in a pipeline through which said fluid is flowing which comprises:

means for incrementally injecting detectable amounts of fluorescent material into said pipeline at a first selected point;

detecting means downstream from said injecting means for detecting the arrival of said fluorescent material at a second selected point in said pipeline;

first and second counting means operatively connected to said injecting means;

means operatively connecting to said injecting means and said detecting means for operating said injecting means;

said detecting means comprising means for alternately actuating said first and second counting means; and means operatively connecting said first and second counting means to said meter;

whereby the volume measured by said meter is compared with the volume of fluid flowed through said pipeline between said selected points over a selected period of time.

9. Apparatus in accordance with claim 8 in which the means for incrementally injecting fluorescent material includes a body of oil soluble fluorescent material dissolved in a solvent.

References Cited

UNITED STATES PATENTS

| 2,637,208 | 5/1953 | Mellen. | |
|---|---|---|---|
| 3,028,744 | 4/1962 | Bagwell et al. | 73—3 |
| 3,250,113 | 5/1966 | Rush | 73—3 |
| 3,302,446 | 2/1967 | Schmitt et al. | 73—3 |

LOUIS R. PRINCE, Primary Examiner

HARRY C. POST III, Assistant Examiner